United States Patent
True

[19]

[11] Patent Number: 5,946,339
[45] Date of Patent: Aug. 31, 1999

[54] STEELMAKING PROCESS USING DIRECT REDUCTION IRON

[75] Inventor: Bradford G. True, Charlotte, N.C.

[73] Assignee: Itz a Gaz, Inc., Tiburon, Calif.; a part interest

[21] Appl. No.: 08/902,543

[22] Filed: Jul. 22, 1997

[51] Int. Cl.$^6$ ........................................................ F27D 1/12
[52] U.S. Cl. ................................................ 373/72; 373/75
[58] Field of Search .............................. 373/2, 9, 44, 45, 373/71, 72, 75; 266/43

[56] References Cited

U.S. PATENT DOCUMENTS

| | | | |
|---|---|---|---|
| 3,832,478 | 8/1974 | Books | 373/75 |
| 3,973,076 | 8/1976 | Scott, Jr. et al | 373/75 |
| 3,994,676 | 11/1976 | Strimple et al. | 432/4 |
| 4,468,780 | 8/1984 | Schellberg et al. | 373/75 |

OTHER PUBLICATIONS

*Carbon Steel from Prereduced Pellets–Acid Practice*, Report of Investigations 7981, by W.L. Hunter, J.E. Tress, and W.A. Stickney, Washington, U.S. Bureau of Mines, 1974, 10 pages.

*Cotinuous Charging and Preheating of Prereduced Iron Ore*, Report of Investigations 8004, by J.E. Tress, W.L. Hunter, and W.A. Stickney, U.S. Bureau of Mines, 1975, 14 pages.

Primary Examiner—Tu Ba Hoang
Attorney, Agent, or Firm—Fliesler, Dubb, Meyer & Lovejoy, LLP

[57] ABSTRACT

A method and apparatus for producing crude liquid steel using direct reduced iron as a raw material in an electric arc furnace with an acid resistant sidewall refractory lining. In order to effect the more economical melting operation, the electric arc furnace uses a slag containing a B4 ratio of (lime+magnesia)/(silica+alumina) in the range of about or less than 1.50, resulting in less slag volume, reduced electric power consumption, reduced electrode consumption, and improved iron yield.

16 Claims, 1 Drawing Sheet

STEELMAKING PROCESS USING DIRECT REDUCTION IRON

FIELD OF THE INVENTION

The invention is related to a steelmaking process using direct reduced iron (DRI).

BACKGROUND OF THE INVENTION

Iron bearing minerals in oxide form are used as raw material in direct reduction processes where a substantial portion of the iron in oxide form is reduced to elemental iron without melting using reductants consisting of gaseous hydrogen, gaseous carbon monoxide or solid carbon bearing reductants, or any combination of these reductants.

The iron bearing materials which are useful in direct reduction also contain non-iron minerals known as "gangue". The most common gangue minerals are silica ($SiO_2$), alumina ($Al_2O_3$), magnesia (MgO) and lime (CaO). Since the direct reduction process is a solid state reduction process, the non-iron bearing "gangue" materials remain in the direct reduced iron product which is used as raw material in the steelmaking process.

During the steelmaking process, gangue contained in the direct reduced iron is separated from the iron by melting and flotation, forming a "slag" which is removed prior to further processing of the liquid steel. The slag also contains wustite (FeO), along with sulfur and phosphorous.

After melting in the electric furnace, the crude liquid steel is separated from the slag during tapping. The crude liquid steel is refined in a ladle prior to solidification. The refining may include removal of sulfur, adjustment of carbon content, addition of manganese, silicon, and aluminum, and adjustment of temperature, after which the refined liquid steel is solidified into the desired shape through a continuous casting process.

The existing electric steelmaking process, using direct reduced iron as the primary raw material, is based on a slag chemistry with a ratio (known as the B4 ratio) of (lime+magnesia)/(silica+alumina) generally greater than 2.0. By producing this highly basic slag chemistry, retention in the slag of sulfur and phosphorous in direct reduced iron materials and scrap is facilitated and along with minimization of the wear rate of the typical magnesia (85%–90%), and carbon (10% to 15%) refractory linings used in the established steelmaking process.

Most iron bearing minerals useful for direct reduction contain a B4 ratio which is substantially lower than 2.0. As a result, the current practice in electric steelmaking process requires the addition of slag forming materials containing lime and magnesia, either blended with the iron bearing mineral during agglomeration before it is processed in the direct reduction process (most commonly into pellets) or added after the direct reduction process into the steelmaking furnace, in order to achieve a slag B4 ratio of greater than generally 2.0.

With the existing electric steelmaking process using a slag B4 ratio of generally greater than 2.0 in order to protect the sidewall of the furnace from being dissolved by the slag, the cost of converting direct reduced iron into steel increases in proportion to the quantity of silica and alumina contained in direct reduced iron, due to (1) the higher consumption of lime and dolomite (magnesia), (2) the higher slag volume, (3) the additional electricity consumption for melting the increased slag volumes, and (4) a decrease in liquid steel yield due to the iron contained in the slag in the form of wustite and/or entrained elemental iron.

SUMMARY OF THE INVENTION

A new steelmaking process, with an improved refractory lining design and a unique slag composition using direct reduced iron as the primary iron bearing raw material, along with lime, dolomite, and electricity, provides substantial cost savings over existing steelmaking process using direct reduced iron and electricity.

This invention is useful as the steelmaking cost using direct reduced iron is reduced. Also, this invention enables the economic use of a wider range of direct reduced iron bearing minerals containing higher levels of silica and alumina without undergoing expensive pretreatment of the iron bearing oxide materials for removal of silica and alumina.

Accordingly, a method of the invention for producing liquid steel from a charge comprising direct reduced iron and using an electric arc furnace comprises a step of using a furnace lined with a refractory comprising magnesia, alumina, and carbon to provide long life when exposed to a slag, introducing an iron bearing material into the furnace and using a slag with a ratio of (lime+magnesia)/(silica+alumina) in the range of about or less than 1.50.

In a further aspect of the invention, an electric arc furnace for producing liquid iron from a charge comprising direct reduced steel is comprised of a vessel, electrodes positioned in the vessel, and a sidewall comprised of magnesia, alumina, and carbon.

In yet a further aspect of the invention, an electric arc furnace for producing liquid iron from a charge comprising direct reduced steel is comprised of a vessel, electric arc electrodes positioned in the vessel, and an acid resistant sidewall lining capable of sustaining a commercial life with a slag having a ratio of (lime+magnesia)/(silica+alumina) in the range of about or less than 1.50.

Other objects, aspects and features of the invention can be obtained from a review of the specification, and the FIGURES.

DETAILED DESCRIPTION OF THE PREFERRED EMBODIMENT

Figure 1:
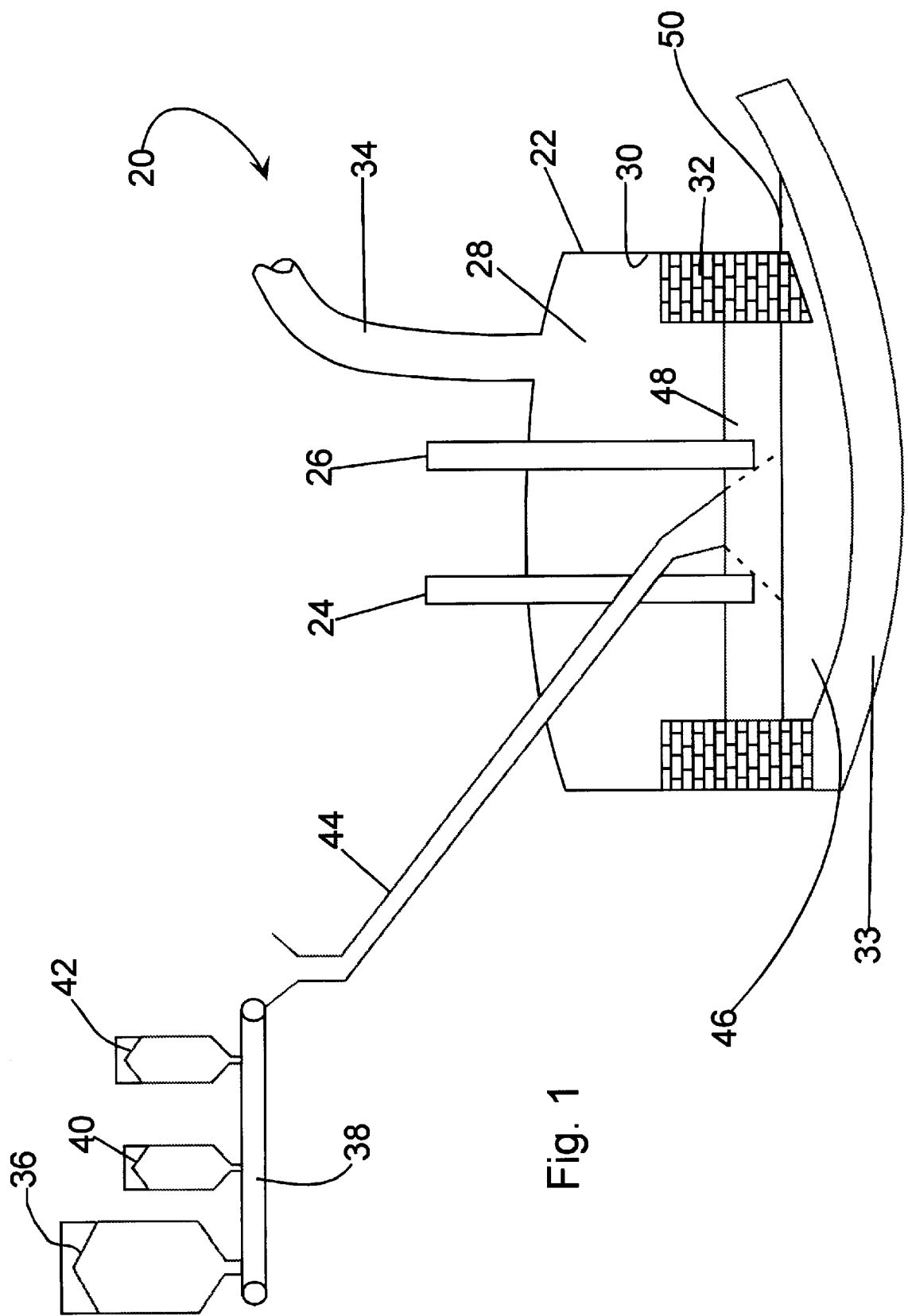
FIG. 1 is a schematic representation of the electric arc furnace and method of the invention.

The electric arc furnace of the invention is depicted in FIG. 1 and is identified by the number 20. The electric arc furnace is comprised of a main vessel 22 with a pair electrodes 24, 26, positioned in the internal chamber 28 of the main vessel 22. The internal chamber 28 includes sidewalls 30 which are lined with an acid resistant sidewall liner 32. The bottom of the main vessel 22 is lined with a furnace bottom refractory liner 33. The electric arc furnace also includes a vent 34 for moving furnace off gases. As can be seen in FIG. 1, associated with the electric arc furnace 20 is a first bin 36 which can contain a supply of direct reduced iron (DRI). First bin 36 dispenses direct reduced iron onto a conveyer belt 38. Another bin 40 contains a supply of lime and a final bin 42 contains a supply of constituting magnesia dolomite. The lime from bin 40 and the dolomite from bin 42 can also be fed onto the conveyer belt 38. From the conveyer belt 38, the lime and dolomite are fed through a feeder pipe 44 in order to be deposited into the internal chamber 28 of the electric arc furnace 20.

The electrodes of the electric arc furnace are powered by a supply of electrical power in order heat the direct reduced iron, lime and dolomite producing a liquid steel bath 46 with slag 48 floating on top thereof. The process liquid steel can be removed from the electric arc furnace 20 through a port 50 located between the sidewall liner 32 and the bottom of refractory liner 33.

In order to use an economical slag, which is a slag where the ratio of (lime+magnesia)/(silica+alumina) is in a range of about or less than 1.50, the acid resistant sidewall lining 32 is comprised of a combination of alumina, magnesia, and carbon (preferably graphite). This material resists the aggressive nature of a slag to dissolve and reduce the effective life of the sidewall lining. With such a lining, the need to add additional lime and magnesia (dolomite) in order to increase the basic nature of the slag is reduced. In effect, the steelmaking cost for using direct reduced iron is reduced. Accordingly, the invention enables the economic use of a wider range of reduced iron bearing materials containing higher levels of silica and alumina without undergoing expensive pretreatment of the iron-bearing ore materials for removal of silica and alumina, and without adding uneconomical amounts of lime and or dolomite. Having a B4 ratio of (lime+magnesia)/(silica+alumina) in the range of about or less than 1.50, the operation of the electric arc furnace 20 provides for less slag with reduced power consumption, enhanced sidewall lining life, and improved iron yield. In addition to the reduced volume of slag, there is an increase in liquid steel yield due to less iron being contained in the slag in the form of wustite or entrained elemental iron.

In a preferred embodiment, the range for the B4 ratio is about 0.25 to about 1.50. Also, in a preferred embodiment, the acid resistant sidewall lining 32 is comprised of a combination of from about 5% to about 90% alumina ($Al_2O_3$), from about 10% to about 80% magnesia (MgO) and about 0% to about 20% carbon.

INDUSTRIAL APPLICABILITY

The present apparatus and method of the invention provides for a steelmaking apparatus and process with an improved refractory lining design and the unique slag composition for direct reduced iron. The invention provides for a lower cost operation with a lower consumption of lime and dolomite, a lower slag volume, a lower electrode consumption rate, less electricity consumed, and with an increase in steel yield.

The invention also provides for a reduced dissolution of the electric arc furnace refractory lining by using an acid resistant sidewall lining.

Other features, aspects and objects of the invention can be obtained from a review of the figures.

It is to be understood that other embodiments of the invention can be developed and fall within the spirit and scope of the invention and claims.

We claim:

1. A method for producing liquid steel in a melting process from a charge comprising direct reduced iron and using an electric arc furnace comprising the following steps of:

using a furnace lined with an acid resistant sidewall refractory lining to increase the effective life of said sidewall when exposed to a slag;

introducing iron bearing raw materials into the furnace; and using a slag with a ratio of (lime+magnesia)/(silica+alumina) in the range of about 1.50 or less.

2. The method of claim 1 comprising the step of:

delivering iron bearing raw materials to said electric arc furnace consisting of at least 50% direct reduced iron containing a ratio of (lime+magnesia)/(silica+alumina) of about 1.50 or less.

3. The method of claim 1 comprising the step of:

delivering lime and dolomite into said electric arc furnace to produce a slag with a chemical composition of (lime+magnesia)/(silica+alumina) in the range of about 1.50 or less.

4. The method of claim 1 comprising the steps of:

heating and melting said direct reduced iron along with lime and dolomite with electricity conducted through a carbon electrode; and forming a molten pool containing slag with a chemical composition of (lime+magnesia)/(silica+alumina) of about 1.50 or less and liquid steel.

5. The method of claim 1 comprising the step of:

separating the slag with a ratio of (lime+magnesia)/(silica+alumina) of about 1.50 or less from the liquid steel after completion of the melting process.

6. The method of claim 1 wherein the ratio is in the range of about 0.25 to about 1.50.

7. The method of claim 2 wherein the ratio of (lime+magnesia)/(silica+alumina) in the direct reduced iron charge is in the range of about 0.25 to about 1.50.

8. The method of claim 3 wherein the ratio of (lime+magnesia)/(silica+alumina) in the direct reduced iron charge is in the range of about 0.25 to about 1.50.

9. The method of claim 4 wherein the ratio is in the range of about 0.25 to about 1.50.

10. The method of claim 5 wherein the ration is in the range of about 0.25 to about 1.50.

11. The method of claim 1 wherein the charge is comprised of at least 50% direct reduced iron.

12. An electric arc furnace for producing liquid steel from a charge comprising direct reduced iron comprising:

a vessel;

electric arc electrodes positioned in the vessel;

a sidewall lining said vessel comprising a combination of magnesia, alumina, and carbon; and wherein said sidewall lining has from (i) about 5% to about 90% alumina, (ii) about 10% to about 80% magnesia, and (iii) 0% to about 20% carbon.

13. The furnace of claim 12 wherein:

said lining is an acid resistant sidewall lining.

14. The furnace of claim 1 wherein said using step includes using a furnace lined with refractory comprising magnesia, alumina and graphite.

15. An electric arc furnace for producing liquid steel from a charge comprising direct reduced iron comprising:

a vessel;

electric arc electrodes positioned in the vessel;

acid resistant sidewall lining; and a slag having a ratio of (lime+magnesia)/(silica+alumina) in the range of about 1.50 or less.

16. The furnace of claim 15 wherein the range is about 0.25 to about 1.50.

* * * * *